United States Patent [19]
Edgell et al.

[11] 4,064,447
[45] Dec. 20, 1977

[54] CORDLESS PORTABLE ELECTRICALLY POWERED DEVICE

[75] Inventors: James Ensign Edgell, Senatobia, Miss.; Lynn David Lineback; Richard Nelson Paul, both of Danville, Va.

[73] Assignee: Disston, Inc., Pittsburgh, Pa.

[21] Appl. No.: 714,916

[22] Filed: Aug. 16, 1976

Related U.S. Application Data

[63] Continuation-in-part of Ser. No. 607,376, Aug. 25, 1975.

[51] Int. Cl.² .................... H02J 7/00; H01M 45/00
[52] U.S. Cl. ..................................... 320/2; 200/157; 339/58
[58] Field of Search ........................... 320/2-5; 310/50; 200/157; 339/58

[56] References Cited

U.S. PATENT DOCUMENTS

| | | | |
|---|---|---|---|
| 3,257,599 | 6/1966 | Somers et al. | 320/2 |
| 3,533,119 | 10/1970 | Dokos | 320/2 X |
| 3,973,179 | 8/1976 | Weber et al. | 320/2 |

FOREIGN PATENT DOCUMENTS

| | | | |
|---|---|---|---|
| 1,418,746 | 10/1965 | France | 320/2 |

*Primary Examiner*—Robert J. Hickey
*Attorney, Agent, or Firm*—B. B. Olive

[57] ABSTRACT

A cordless electric device has an external side pocket for receiving a battery pack power source. The battery pack includes a pair of standard AC prongs projecting from one flat sidewall. The prongs may be received by a set of openings in the device pocket for powering the tool or may be inserted into an ordinary AC household receptacle for charging the batteries. A spring-loaded switch located on the same pack sidewall has a first normal position for connecting the batteries to a rectifier for charging and a second actuated position for connecting the batteries directly to the prongs for powering the device. The device is provided with a manually operable mechanism for contacting the spring-loaded switch in the pack and thereby switching the pack from a charge to a discharge mode. In a specific embodiment, the actuating mechanism comprises a trigger mounted on a pistol-type soldering gun. The trigger has a movable post member made integral with the trigger for contacting the battery pack switch when the trigger is depressed. The prong contacts in the device may, therefore, be directly connected to the device load unit so that the on-off switching function is performed solely by the trigger mechanism without the need for a separate electrical switch on the device.

7 Claims, 21 Drawing Figures

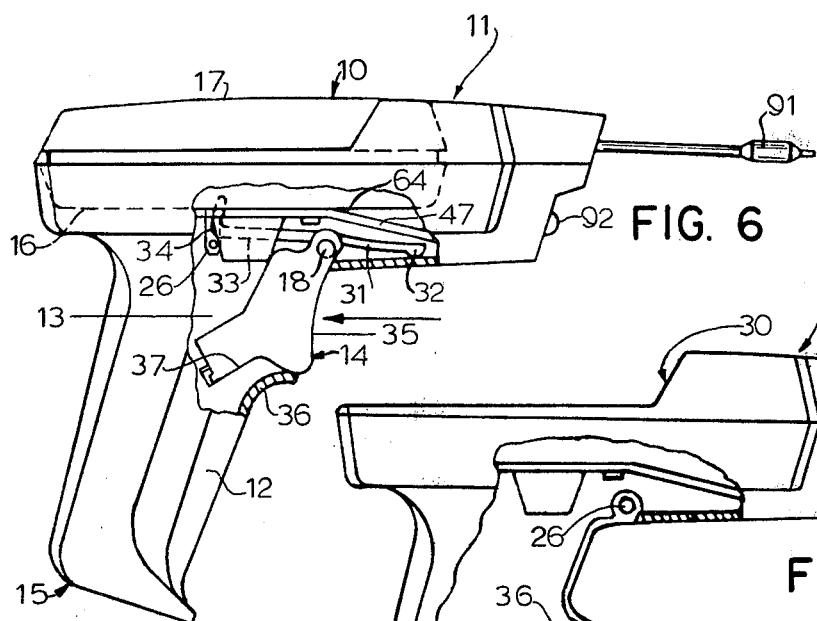
FIG. 6
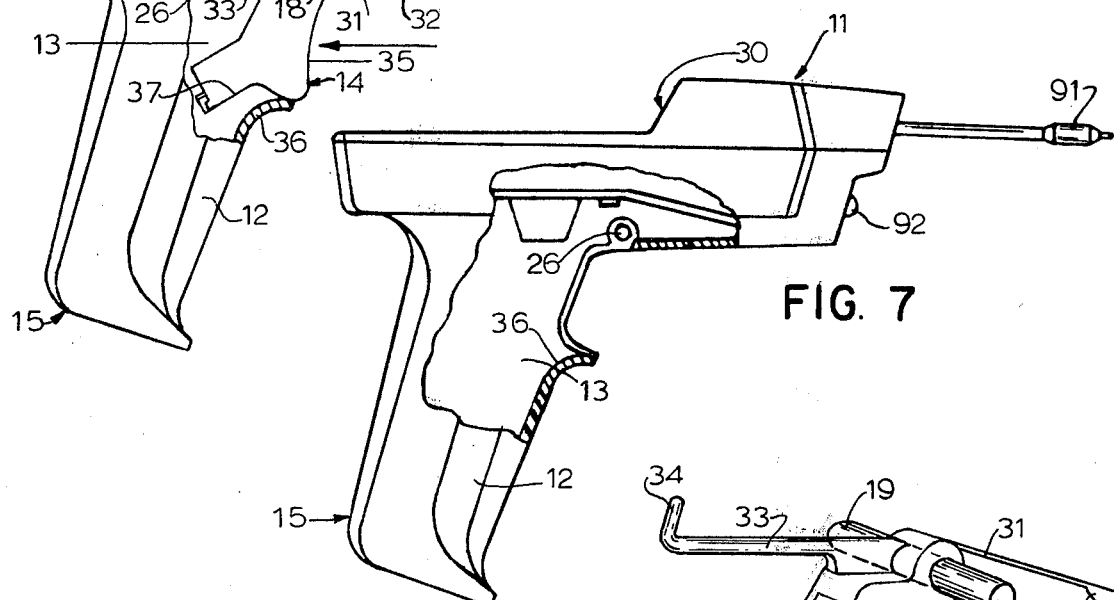
FIG. 7
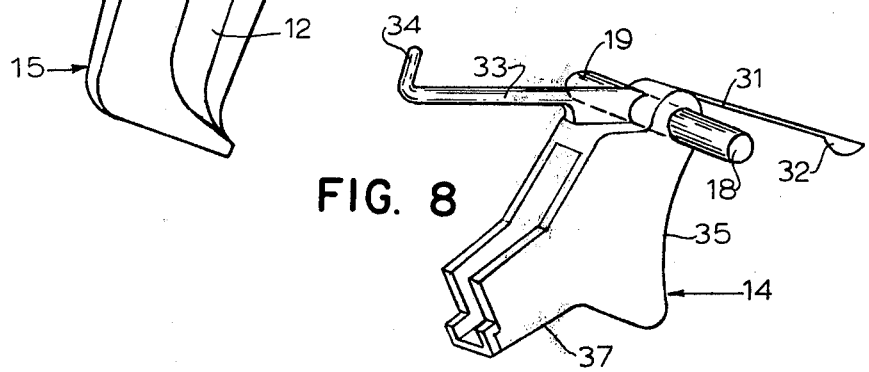
FIG. 8
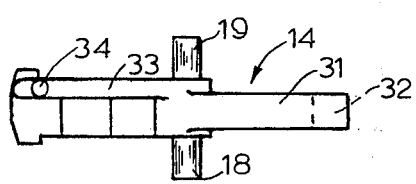
FIG. 9
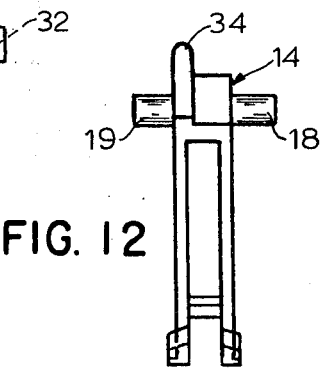
FIG. 10
FIG. 12
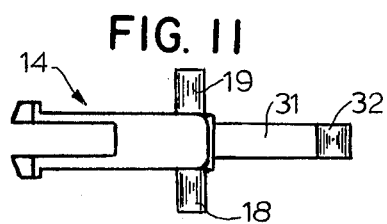
FIG. 11

CORDLESS PORTABLE ELECTRICALLY POWERED DEVICE

CROSS-REFERENCE TO RELATED APPLICATION

This application is a continuation-in-part of commonly assigned copending application, Ser. No. 607,376, filed Aug. 25, 1975, entitled "Cordless Electric Devices", the teachings of which are incorporated herein by reference.

BACKGROUND OF THE INVENTION

The invention relates to cordless electric devices. In particular, the invention relates to cordless electric devices powered by removable battery packs and to the manner of actuating the charge-discharge mode switch on such packs.

The availability of rechargeable batteries has lead to a variety of rechargeable battery-operated "cordless" devices including grass shears, hedge trimmers, toothbrushes, shrub trimmers, lawn mowers, flashlights, sprayers, screwdrivers, soldering irons, and the like. In some cases, the batteries are housed in a nonremovable pack. The recharging circuitry usually comprises a separate charging unit. In other cases, the charging circuitry is incorporated as a part of a rechargeable battery pack. It has also been previously proposed to provide a removable battery pack having its own recharging circuitry, the pack having AC type prongs and arranged so that the pack can be interconnected through the prongs to the device to be powered or through the same prongs to a household receptacle for recharging. It has also been suggested to have a removable rechargeable battery pack that could be connected to any one of several battery power consuming devices. A review of prior art practices with regard to battery pack powered devices is given in copending application, Ser. No. 607,376, and will not be repeated here.

The prior art practice was improved upon by the subject matter of copending application, Ser. No. 697,376, by providing cordless devices of a type which have a housing incorporating one or more pockets of unique construction adapted to receive one or more interchangeable battery packs. The battery pack is characterized by being in a rather rectangular flat box-like shape and having a pair of AC type prongs projecting from a position intermediate the length and width of one flat sidewall surface of the pack. These prongs are adapted to be received by a corresponding set of receptacle openings provided in the case plate member or, for recharging, to be received by an ordinary household receptacle supply. The switch in the battery pack unit of the prior invention comprises a double-pole, double-throw, spring-loaded switch which is incorporated as a part of an AC prong assembly which mounts both the AC prongs of the battery pack and the switch. This switch connects the rectifier means to the battery during recharging and is activated and spring-loaded by a fixed post member in the base of the pocket when the pack is installed and latched in its pocket to connect the prongs to the battery for discharge without requiring manual switching. Also, the switch spring causes the pack to tilt, i.e., to pop out, when unlatched. To facilitate uniformity in the pocket and insertion, retention and removal of the pack of the prior invention, the pocket in each device is provided with an outwardly opening receptacle formation at one end of the pocket whose perimeter is defined by a standardized pocket base plate having an inwardly inclined end so that the battery is inserted and removed by first assuming a tilted position on the base plate. When the battery pack is unlatched, it pops out and initially assumes such an outwardly tilted position. It is then withdrawn from the pocket by linear motion. During insertion, one end of the battery pack is first inserted in the receptacle formation in a tilted position and is then rocked about the inserted end of the pack, the receptacle formation insuring insertion of the prongs of the pack into the mentioned housing base plate receptacle of the device after which it is latched. The battery pack also includes a pair of spring contacts in the prong receiving receptacle of the device which makes both electrical and mechanical contact with the edges of the prongs being inserted and which insure both positive electrical and mechanical contact with the prongs. The mentioned switch spring in conjunction with these spring contacts causes the pack, when unlatched, to pop out as described. U.S. Pat. Nos. 3,370,475, 3,646,298 illustrate related trigger switches and it should be pointed out that all of the devices described in copending application, Ser. No. 607,376, require a separate electrical make-break switch on the device for starting and stopping the device. Such a switch is made necessary because when the pack is inserted in the pocket it is automatically placed in a discharge mode by the above-described fixed post member that contacts the spring-loaded switch. Thus, the device carries one electrical switch and the pack another. It is an object of the present invention to provide a tool design so that by actuating only the pack switch, power may be supplied to the load unit without the need for an intermediate electrical switch located on the device. By so doing, the battery pack switch is, in effect, being used as the electrical switch for the device and the electrical lead wires from the prong contacts may be directly connected to the load unit.

SUMMARY OF THE INVENTION

The apparatus of the present invention provides improved means for actuating a rechargeable battery pack such as the pack disclosed in copending application, Ser. No. 607,376. The pack configuration to which the invention is most readily applicable is a pack having a housing enclosing a rectifier and rechargeable batteries and having an externally accessible actuator switch for switching the pack from a first charge mode wherein the pack prongs are connected to a rectifier to a second discharge mode wherein the prongs are connected directly to the batteries for powering the device. As described in copending application, Ser. No. 607,376, the spring-loaded switch in the pack may be automatically actuated by a fixed post member in the tool pocket and thereby placed in the discharge mode whenever the pack resides in the pocket. This design requires the use of an electrical switch on both the device and the pack. The present invention is based on the realization that the pack switch may be used as the electrical switch for the tool, thereby omitting the expense of providing an electrical switch on the device itself. This objective is accomplished by providing a manually operable movable switch actuator on the device instead of a fixed post member that automatically engages the switch upon insertion of the pack. Therefore, when the pack is inserted in the device, it remains in the normal charging mode until the operator chooses to engage the pack switch by the manually operable actuator. In a specific embodiment, the actuator is a post member made integral with a trigger located on a pistol-type soldering iron. When the trigger is depressed, the post actuator moves through an aperture in the pocket liner and projects outwardly to engage the pack switch. Thus, the batteries are directly connected to the load unit whenever the trigger is depressed. Therefore, a primary object of the present invention is to provide an alternative actuating mechanism for battery pack powered devices of the type found in copending application, Ser. No. 607,376, while retaining the many advantages of such devices.

DESCRIPTION OF THE DRAWINGS

FIG. 6 is a view similar to that of FIG. 5 with the battery pack installed into the device and the trigger switch in a depressed, operative position.

FIG. 7 is a fragmentary, side elevation view similar to FIGS. 5 and 6, battery pack removed, and illustrating the tool liner and trigger receiving mount.

FIG. 8 is a pictorial view of the trigger switch employed in the present invention.

FIG. 9 is a plan view of the trigger switch.

FIG. 10 is a side elevation view of the trigger switch.

FIG. 11 is a bottom plan view of the trigger switch.

FIG. 12 is a rear elevation view of the trigger switch.

DESCRIPTION OF THE PREFERRED EMBODIMENT

Substantial background information has been set forth in copending application, Ser. No. 607,376, to which reference should be made in understanding the present invention. Of particular interest to the present invention is the fact that all of the devices disclosed in copending application, Ser. No. 607,376, require an electric make-break switch on the device because the battery pack is automatically placed in a so-called "discharge mode" when it is inserted into the tool pocket. That is, upon insertion of the pack into the tool, cooperative switch actuating means in the tool pocket and on the pack automatically actuate the charge-discharge mode switch on the pack and connect the prongs directly to the batteries. As a result, the electrical circuitry of the tool must be provided with a make-break switch. The present invention is primarily directed to the realization that only one electrical switch, the one within the pack, is necessary for certain tools, especially those tools having a handle formation capable of mounting a trigger or the like.

In order to best understand the subject matter being claimed and which is of particular interest to the present application, the description will first summarize the most relevant aspects of the teachings of copending application, Ser. No. 607,376, with reference to FIGS. 1, 2 and 3. Thereafter, the description will be directed to describing the manually operable switch actuator which is the particular subject of this application.

Figure 1:
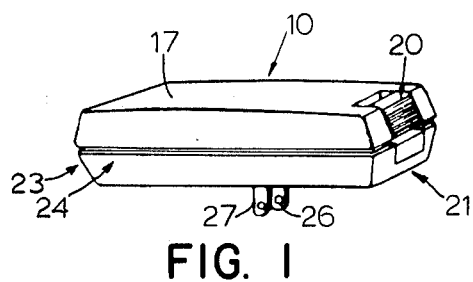
FIG. 1 is a pictorial view of the battery pack employed in the present invention device.
Figure 2:
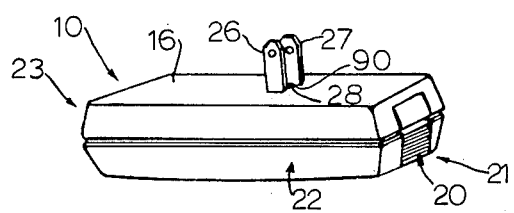
FIG. 2 is a pictorial view of the battery pack of FIG. 1 and being inverted to show the AC prongs.

FIGS. 1 and 2 illustrate the battery pack 10 utilized with the present invention. Battery pack 10 has a generally rectangular, flat box-like shape, i.e., a rectangular parallelepiped shape, and has rectangular, generally flat, sidewall surfaces 16 and 17 and sides 21, 22, 23, 24. A pair of standard rigidly mounted AC blades or prongs 26, 27 extend from surface 16 and are oriented parallel to the central long axis of pack 10 with the prongs being located at a position intermediate the length and width of wall surface 16. Blades 26, 27 are on opposite sides of, and offset different distances from, the longitudinal centerline of pack 10. Located between prongs 26, 27 and recessed slightly below an aperture 90 in the pack housing is a spring-loaded switch actuator 28. Actuator 28 must be engaged by a post member to switch the pack circuitry from the charging to the discharging mode after pack 10 is installed in a manner to be described later. Side surface 21 is provided with a resilient latch member 20 which is adapted to engage a ledge portion of the tool pocket in order to hold pack 10 in place.

Figure 3:
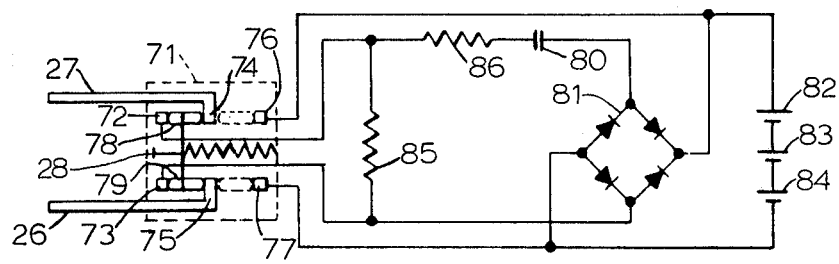
FIG. 3 is a schematic circuit diagram of the charging and discharging circuitry of the battery pack.
Figure 4:
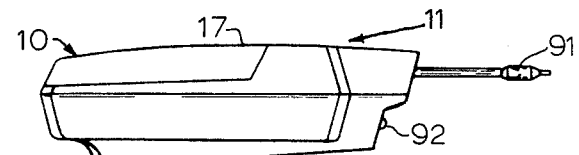
FIG. 4 is a side elevation view of a cordless electric soldering iron and battery pack of the present invention.

The charging and discharging circuitry of pack 10 will now be described with reference to the schematic circuit diagram of FIG. 3. A double-pole, double-throw switch 71 is adapted to place the circuitry in either a charging or discharging mode. Switch 71 includes six terminals 72, 73, 74, 75, 77. AC terminals 72, 73 are connected to the charging circuitry. DC terminals 76, 77 are connected to the discharge circuitry. Common terminals 74, 75 are connected directly to the AC prongs 26, 27 and are, in the preferred embodiment, continuations of the prongs themselves. Movable contacts 78, 79 are spring-loaded in such a manner that they normally connect AC terminal 72 to terminal 74 and AC terminal 73 to terminal 75 as depicted in FIG. 3. The charging circuitry comprises (b) a capacitor 80 which is adapted to drop the input voltage; (2) a diode bridge full wave rectifier 81; (3) batteries 82, 83, 84 connected in series; (4) a bleed resistor 85 which is selected to quickly bleed by completing an RC ciruit with a short time constant; and (5) a surge resistor 86 which prevents the diode bridge 81 from receiving a large surge when capacitor 80 is completely discharged. The discharge circuitry is, of course, a direct connection between AC prongs 26, 27, terminals 74, 75, and batteries 82, 83, 84.

A cordless electric device well suited for operation according to the present invention is a soldering iron 11 illustrated in FIGS. 4–7. Soldering iron 11 includes a pair of clamshell members 12, 13 which snap fit together to form a housing having a handle grip 15. Iron 11 further includes a heating element 91 and an indicator lamp 92. A trigger switch 14 protrudes through an opening in the front portion of handle grip 15. Trigger 14 has a pair of pin members 18, 19 molded integral with trigger. The pins 18, 19 reside in a pair of mating holes 26, (See FIG. 7) in the internal housing walls so that trigger 14 may pivot when depressed. Trigger 14 includes an integral, thin leaf spring member 31 that ends in a thickened bearing knob 32. When trigger 14 is a non-depressed position (FIG. 5), spring member 31 is relatively straight with knob 32 resting on an inside bottom wall of iron 11. When the trigger is depressed, member 31 bends so as to provide resistance to trigger motion and to return the trigger to its normal non-depressed position after it is released by the operator. Also molded integral with trigger 14 is a pack switch actuating member 33. Member 33 has an angled upright tip 34 which serves as the actuating pin for battery pack 10 in a manner that will be described later in the description. As best shown in FIG. 8, trigger 14 is essentially a hollow member having a solid finger engagable surface 35. Trigger 14 is prevented from pivoting out of soldering iron 11 by handle wall 36 which engages trigger extension 37.

The description will now turn to a detailed discussion of the soldering iron pack receiving pocket 30 depicted in FIGS. 13, 16, 17 and 18. Pocket 30 is formed as an integral part of clamshell housing members 12, 13 in the top surface of soldering iron 11 where battery pack 10 can be easily inserted for overall tool balance. The thin base wall of pocket 30 is defined by a pocket liner 40. In order to retain liner 40 in place, pocket 30 is provided with a plurality of liner locators 41 which extend from the housing interior wall surfaces of pocket 30 and are adapted to engage locator grooves 42 in liner 40. A front housing wall member 43 of pocket 30 is provided with a recess 44 for receiving a projection 45 on liner 40 as a further means for locating and holding in place liner 40. Pocket 30 is devoid of guideways and the like enabling pack 10 to be inserted and remove by a rocking motion and to pop out when unlatched.

Figure 14:
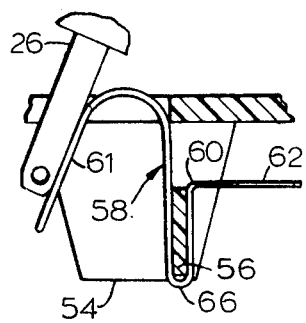
FIG. 14 is an enlarged, fragmentary view of the spring contact member as it is initially engaged by the AC prong edges of the battery pack during insertion of the pack.
Figure 15:
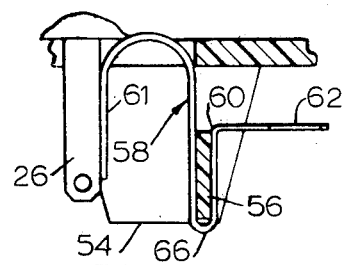
FIG. 15 is a view similar to FIG. 14 showing the prongs fully inserted.
Figure 16:
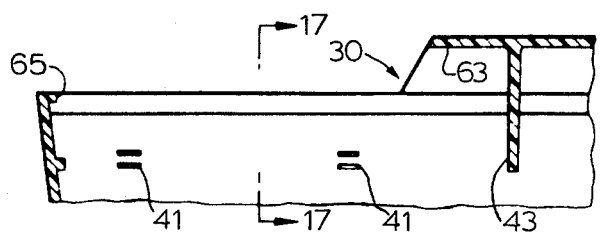
FIG. 16 is a fragmentary vertical section view through the battery pocket of the invention device with the liner removed and taken substantially along line 16—16 of FIG. 18.
Figure 17:
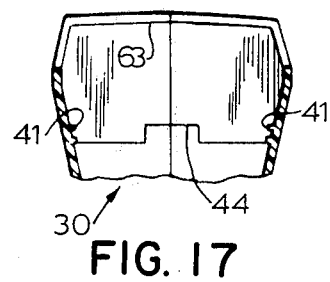
FIG. 17 is an end fragmentary section view of the pocket along line 17—17 of FIG. 16.
Figure 18:
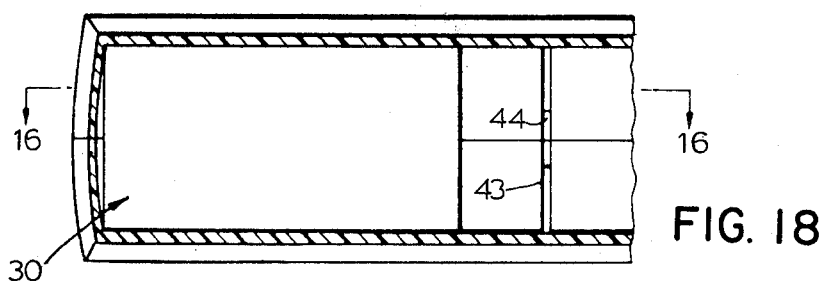
FIG. 18 is a fragmentary section through the battery pocket.
Figure 19:
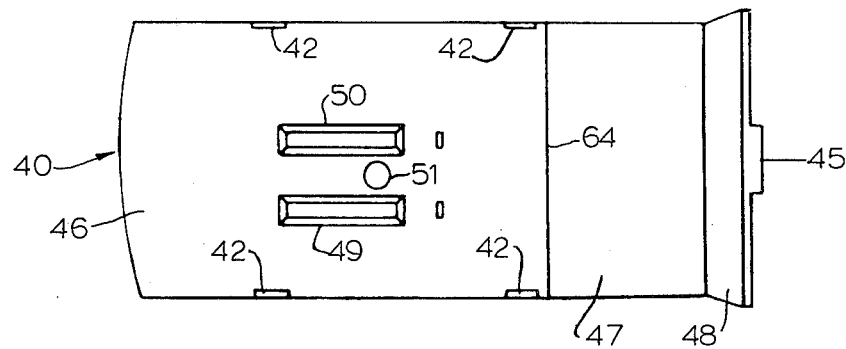
FIG. 19 is a top view of the pocket base plate or liner and shows the slot openings for receiving the AC prongs of the pack.
Figure 20:
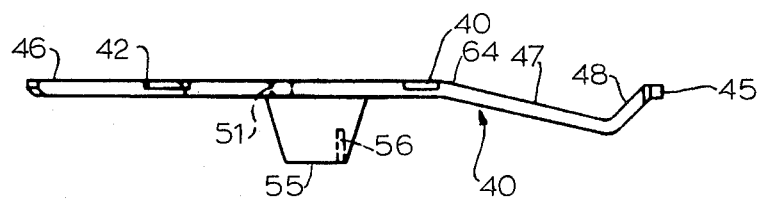
FIG. 20 is a side elevation view of the pocket base plate or liner illustrated in FIG. 19.
Figure 21:
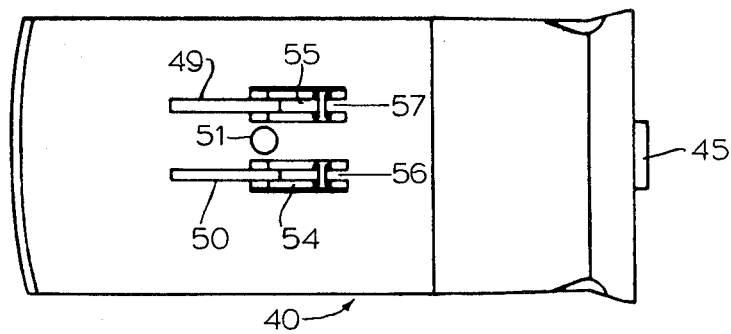
FIG. 21 is a bottom view of the liner.

The pocket liner 40, which serves as a base wall in pocket 30, is illustrated in FIGS. 19, 20 and 21. Liner 40 is identical to the liner disclosed in copending application, Ser. No. 607,376, except the fixed post member described in the prior application has been removed and replaced by an opening 51. Opening 51 permits the actuating tip 34 of the trigger to pass through liner 40 and into contact with the pack switch actuator 28. Liner 40 includes a flat surface 46, a downwardly and inwardly inclined surface 47, an upwardly inclined lip portion 48, and an extension or projection 45. Flat surface 46 is adapted to engage surface 16 of battery pack 10 when pack 10 is inserted into pocket 30. Surfaces 47, 48 are adapted to facilitate the pivotal insertion and removal of pack 10 as later described. Surface 46 provides two prong receiving chamfered slots 49, 50. The bottom surface of liner 40 provides a pair of contact spring holders 54, 55 having post members 56, 57 located in the central portion thereof. As shown in FIGS. 14 and 15, posts 56, 57 serve to locate the contact springs 58, 59 (only one shown). Contact springs 58, 59 are curved leaf springs of resilient conductive metal each having a loop locator portion 66, a retainer member 60, a U-shaped prong engagement portion 61, and a wire lead contact 62. Loop 66 is adapted to be press-fitted over one of post members 56, 57. When loop 66 is pressed into place, a resilient barb formation 60 locates on post member 56 or 57 in order to hold the contact spring in place. Prong engagement portion 61 is normally in the external position shown in FIG. 14. As pack 10 is pivoted into pocket 30, one of prongs 26, 27 contacts spring portion 61 and bends it until pack 10 is fully inserted (FIg. 15). Contact spring 58 is thus adapted to provide exceptionally reliable electrical contact with the leading edges of AC prongs 26, 27. The mechanical energy stored in the contact springs 58, 59 when depressed (FIG. 15) is released as the pack is removed so as to cause the pack to pop out to the position shown in FIG. 5. Wire lead contact 62 of the contact spring is adapted to electrically connect spring 58 to the appropriate wire leads of soldering iron 11.

Figure 5:
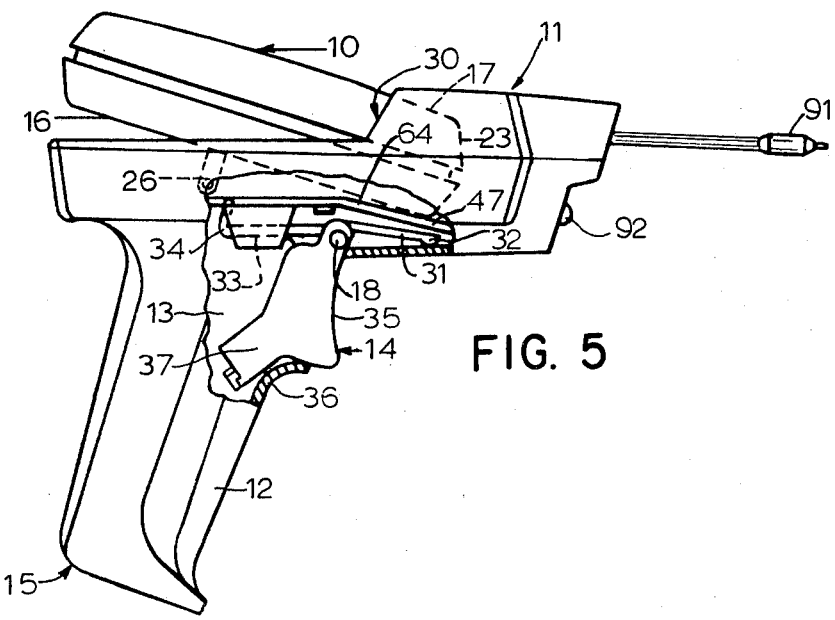
FIG. 5 is an enlarged, fragmentary side elevation view of the present invention illustrating a battery pack being inserted into the device and the trigger switch in a non-operative position.
Figure 13:
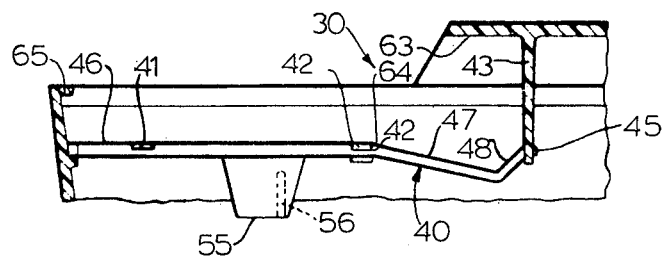
FIG. 13 is a fragmentary vertical section view through the battery pocket of the invention device with the liner installed.

The method of insertion and removal of pack 10 into pocket 30 is best illustrated in FIGS. 5 and 6. Soldering iron 11 is held by one hand with pocket 30 facing upwardly. With the other hand, the operator picks up pack 10 with prongs 26, 27 facing downwardly. End 23 of pack 10 is then inserted into pocket 30 with pack surface 16 resting on inclined surface 47 and with pack surface 17 residing proximate the inside top surface 63. Pack 10 is now rocked about a pivot point 64 until the pack side surface 16 lies flush against flat surface 46 of liner 40 (FIG. 6). During this rocking movement, prongs 26, 27 enter chamfered slots 49, 50 until prongs 26, 27 engage and bend contact springs 58, 59. When pack 10 is fully inserted, pocket lip 65 engages latch 20 in order to hold pack 10 in place without requiring guideways or the like. Thus, the front receptacle portion of pocket 30 formed by the portions 47 and 48 of liner 40, housing wall 43 and inside top wall surface 63 locates pack 10 for insertion, supports pack 10 during the rocking movement and holds the forward end of pack 10 securely in place.

The removal of pack 10 from pocket 30 becomes a two-step operation which provides a degree of protection against accidental unlatching or dropping of pack 10. First, latch 20 is depressed so that it disengages pocket lip 65, and by the spring action provided as contact springs 58, 59 force prongs 26, 27 outward, pack 10 moves to and is held in a partially removed position as illustrated in FIG. 5. Second, pack 10 is lifted from pocket 30.

The circuitry of battery pack 10 and the outward biasing of pack switch actuator 28 causes the batteries to be normally connected to the AC prongs 26, 27 through the rectifier for recharging. When pack 10 is initially inserted in the tool, the pack remains in this recharging mode. By depressing trigger 14, the operator may move trigger tip 34 upwardly through opening 51 in liner 40 and into contact with pack switch actuator 28 so that the batteries are directly connected to the AC prongs 26, 27 for discharge and use as a power source.

As previously mentioned, the primary advantage of the improved battery pack actuator of the invention is the elimination of the electrical make-break switch on the tool. Because the battery pack switch is, in effect, being used as the electrical switch for soldering iron 11, the electrical lead wires from the lead contacts 62 may be connected directly to the soldering iron tip 91 and indicator lamp 92 without the need for an intermediate electrical switch located on the tool. It is apparent that such a modified switch activating mechanism involving the movable trigger tip 34 has numerous advantages for certain tools and devices having a handle formation capable of mounting a trigger or the like for activating the movable tip. The cost of adding an electrical switch to the tool itself is eliminated. Other tools adaptable to this activating mechanism include a ribbon-type glue gun (not shown). It should be appreciated that numerous other operator-controlled mechanisms may be utilized to move a movable tip into engagement with switch actuator 28 or similar battery switches.

What is claimed is:

1. In a cordless portable electrically-powered tool, means defining a housing having a battery pack receiving recess, means defining the base of said recess comprising an elongated plate for receiving said pack during insertion in and removal from said recess, laterally spaced parallel linear openings at an intermediate portion adapted to receive a pair of contact prongs of the type adapted for insertion into a conventional household electrical outlet, and an aperture spaced from said openings, and said tool having manual switch means manually movable from an inoperative position to an operative position for projecting through said aperture to contact and actuate a switch located on a pack inserted in said recess.

2. A tool as claimed in claim 1 wherein said manual switch means includes a post projection integrally connected to a finger trigger member for moving through said aperture in response to actuation of said trigger member.

3. In a portable battery-powered device, a housing enclosing an electrical apparatus adapted to operate from a battery pack of the type having a charge-discharge mode switch located thereon, said housing having a pack receiving pocket with an outwardly open side, a substantially rectangular base wall member rigid with said housing and forming the bottom wall of said pocket opposite the open side thereof, said base wall member having a pair of elongated prong receiving openings and an aperture located between said elongated openings, internal prong contacts adjacent said openings, means for electrically connecting said prong contacts to said apparatus, and a manually movable switch member normally positioned internal of said housing and manually operable to protrude outwardly through said aperture to actuate said pack switch.

4. In a cordless electric device of the type having a pistol configuration with a substantially vertically aligned grip portion and a forwardly projecting portion enclosing the device apparatus, said device having a pocket for receiving a rechargeable battery pack having an internal switch accessible through an aperture in the pack housing, means for actuating said switch comprising a trigger member mounted on said grip for limited rotational motion about an axis transverse to the grip, said trigger having a finger engageable portion extending through a forward opening in said grip, switch engagement means integrally formed as a part of said trigger and being aligned with said pack housing aperture when said pack is fully inserted into said pocket and said trigger being movable by rotation about said axis to an operative position wherein said engagement means protrudes through said pack housing aperture for moving said pack internal switch.

5. A device as claimed in claim 4 wherein said switch is positionable for selectively placing said pack in either a charge mode or discharge mode, said switch including a spring-loaded actuator accessible through said aperture in the pack housing with such actuator being normally biased outwardly to place said pack in a charge mode and contactable by said engagement means to place said pack in discharge mode.

6. A device as claimed in claim 4 including means for normally biasing said trigger outwardly through said grip opening to a first inoperative position wherein said engagement means is spaced from and out of engagement with said pack switch.

7. A device as claimed in claim 6 wherein said means for biasing said trigger includes a leaf spring member integrally formed as a part of said trigger member and positioned to engage an inner wall portion of the device housing.

* * * * *

UNITED STATES PATENT OFFICE
CERTIFICATE OF CORRECTION

Patent No. 4,064,447        Dated  December 20, 1977

Inventor(s)  James Ensign Edgell, et al

It is certified that error appears in the above-identified patent and that said Letters Patent are hereby corrected as shown below:

Col. 1, line 42, "697,376" should read --607,376--.
Col. 1, line 51, "case" should read --base--.
Col. 2, line 13, delete "battery pack" and insert --the base plate receptacle--. (our error)
Col. 4, line 51, after "75" insert --76--.
Col. 4, line 60, "(b)" should read --(1)--.
Col. 4, line 64, "ciruit" should read --circuit--.
Col. 5, line 11, insert --the-- after "with".

Signed and Sealed this

Thirtieth Day of May 1978

[SEAL]

Attest:

RUTH C. MASON
Attesting Officer

LUTRELLE F. PARKER
Acting Commissioner of Patents and Trademarks